US006427400B1

(12) United States Patent
Greenblatt

(10) Patent No.: US 6,427,400 B1
(45) Date of Patent: Aug. 6, 2002

(54) CABLE SUPPORT APPARATUS

(76) Inventor: Drew Greenblatt, 2640 Merchant Dr., Baltimore, MD (US) 21230

( * ) Notice: Subject to any disclaimer, the term of this patent is extended or adjusted under 35 U.S.C. 154(b) by 0 days.

(21) Appl. No.: 09/791,696

(22) Filed: Feb. 26, 2001

(51) Int. Cl.[7] .............................. E04B 5/48; F16L 3/00
(52) U.S. Cl. ...................... 52/220.5; 52/126.2; 52/263; 248/49
(58) Field of Search .............................. 52/126.6, 126.2, 52/220.3, 220.5, 263, 220.1; 248/49; 174/48, 68.3

(56) References Cited

U.S. PATENT DOCUMENTS

| 4,596,095 A | * | 6/1986 | Chalfant | ..................... 52/126.6 |
| 5,477,649 A | * | 12/1995 | Bessert | ......................... 52/263 |
| 5,548,932 A | * | 8/1996 | Mead | ........................ 52/126.6 |
| 5,663,527 A | * | 9/1997 | Hui | ............................ 174/68.3 |
| 5,953,870 A | * | 9/1999 | Jette | ........................... 52/220.1 |
| 6,347,493 B1 | * | 2/2002 | Jette | ........................... 52/220.1 |
| 2001/0011441 A1 | * | 8/2001 | Jette | ........................... 52/220.1 |
| 2002/0003194 A1 | * | 1/2002 | Simmons | ..................... 248/49 |
| 2002/0014045 A1 | * | 2/2002 | Jette | ........................... 52/220.1 |

FOREIGN PATENT DOCUMENTS

| JP | 3-233073 | * | 10/1991 | ................ 52/220.5 |
| WO | WO 90/10966 | * | 9/1990 | ................ 52/220.3 |

* cited by examiner

Primary Examiner—Laura A. Callo

(57) ABSTRACT

A below in floor lengthwise interconnected arrangement of wire baskets serving as a repository of cables for computers and like apparatus, in which opposite sides of the baskets are assembled in depending relation from opposite side supports by inverted U-shape hooks thereof being urged in ascending movement through an opening into a compartment of each opposite support bounded by U-shaped edges, and resulting in the inverted U-shapes and upright U-shapes engaging with each other.

1 Claim, 2 Drawing Sheets

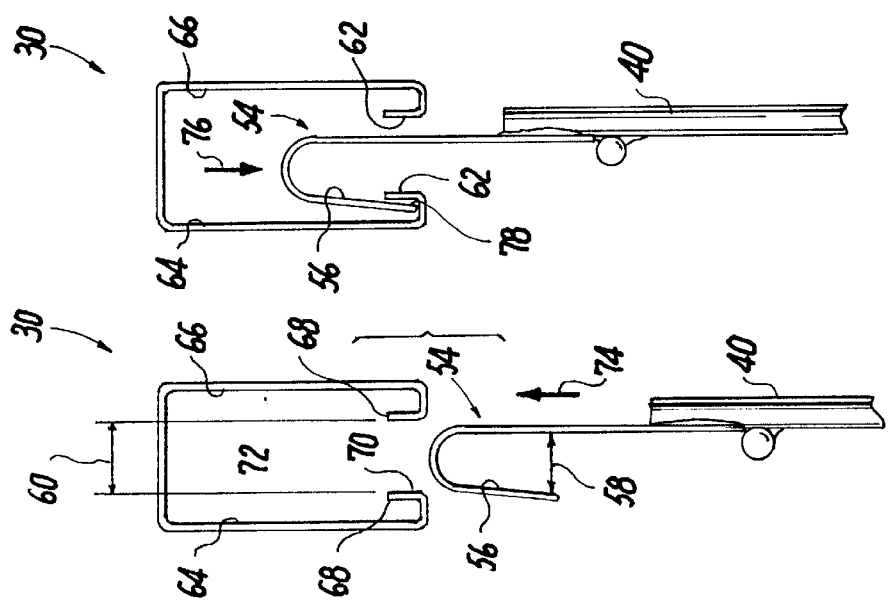
FIG. 4
FIG. 5
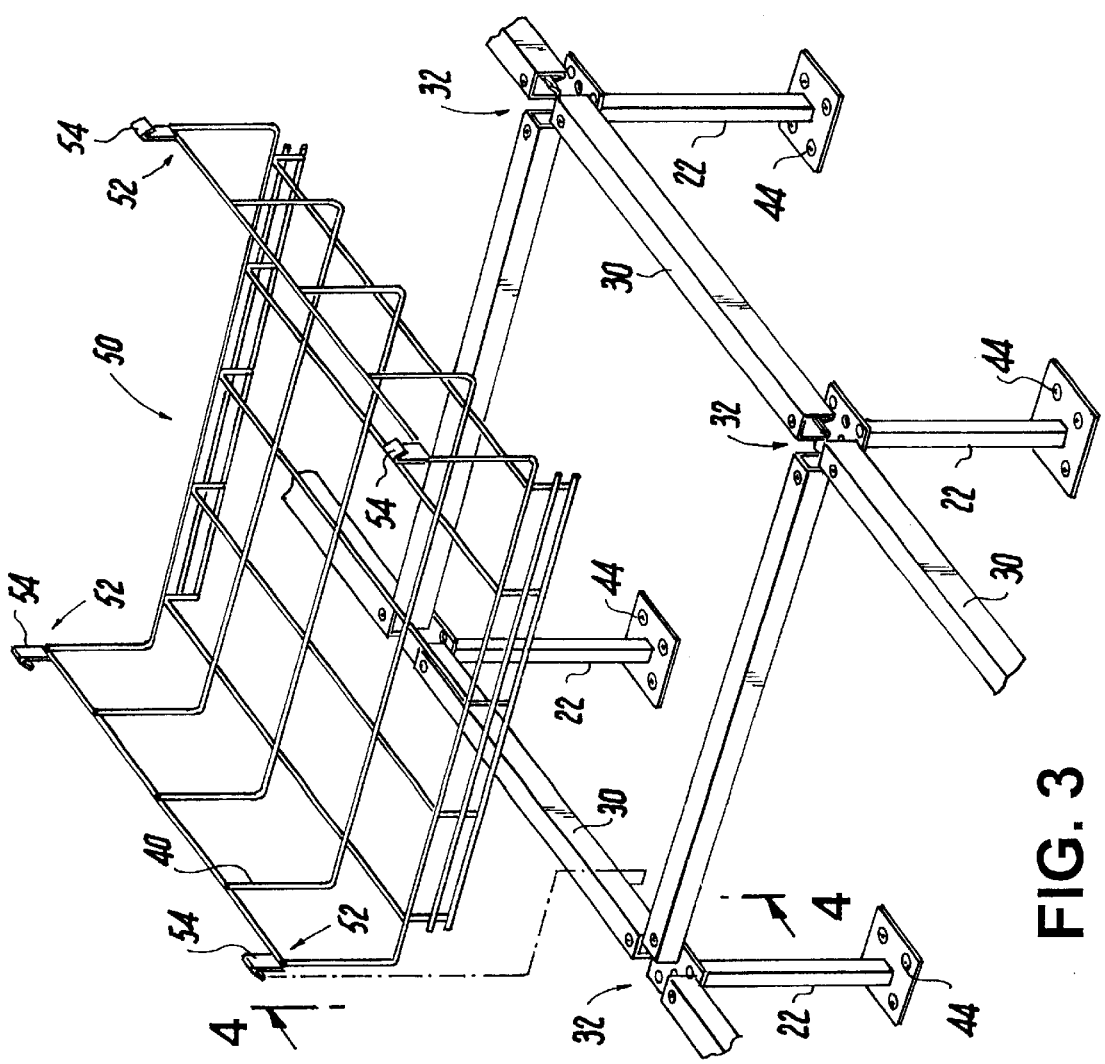
FIG. 3

CABLE SUPPORT APPARATUS

The present invention relates to raised floor systems and more particularly to a cable support assembly for use in connection with a raised floor system.

EXAMPLE OF THE PRIOR ART

Raised floor systems have been developed to provide the additional utility space needed in various different conduit or cable intensive environments where the original construction did not provide adequate means of accommodating the vast amount of conduit or cable. For example, probably the most common environment requiring vast amounts of additional protected space is for large computing systems. Such installations were typically made in facilities which simply were not designed to accommodate the vast amount of cable runs required to operate the typical large computer system. Other applications where additional utility space is required include mechanical systems, e.g., heating, ventilating and air conditioning systems.

A common problem experienced in utilizing raised floor systems is maintaining organization of the various cables, conduits, pipes, etc. which are routed beneath the floor system. One solution to this problem is to provide a cable tray system beneath the floor panels of the raised floor to contain and direct cables along their respective pathways. An example of such a cable tray system is disclosed in U.S. Pat. No. 4,596,095 which issued on Jun. 24, 1986 to Chalfant (the "'095 Patent"). The '095 Chalfant Patent features a modular cable tray assembly which is formed from modular sections which include a number of different components all of which must be separately assembled to form the cable tray. For example, the cable tray includes separate straight sections, horizontal bend sections, horizontal tee sections, horizontal cross-intersection sections, as well as splice plates to connect the various components to each other as well as support the assembled cable tray above the building floor. Such a cable tray assembly is, therefore, independent of the raised floor system.

A significant drawback of such a raised floor and cable support system is the additional labor required to assemble the various components of the separate raised floor and cable support systems. In geographic regions with particularly high labor rates, the cost of erecting such a labor intensive dual system could prove to be cost prohibitive.

Broadly, it is an object of the present invention to provide a cable support apparatus for a raised floor system, in which the apparatus is in the specific form of interconnected wire baskets, overcoming the foregoing and other shortcomings of the prior art.

More particularly, it is an object to obviate tedium and other installation requirements, such as welding, bolting, and the like, in the implementing of the supporting wire baskets preparatory to their use in cable-repository channels of a raised floor system, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 3 is a perspective view of a cable support apparatus of the present invention similarly to be installed in the raised floor system of FIG. 1;

FIG. 4 is detailed view as seen in the direction of line 4—4 of FIG. 3 illustrating a preliminary installation condition of wire basket component(s) of the cable support apparatus; and FIG. 5 is a view similar to FIG. 4 and illustrating the completion of the installation of the wire basket component(s).

Figure 1:
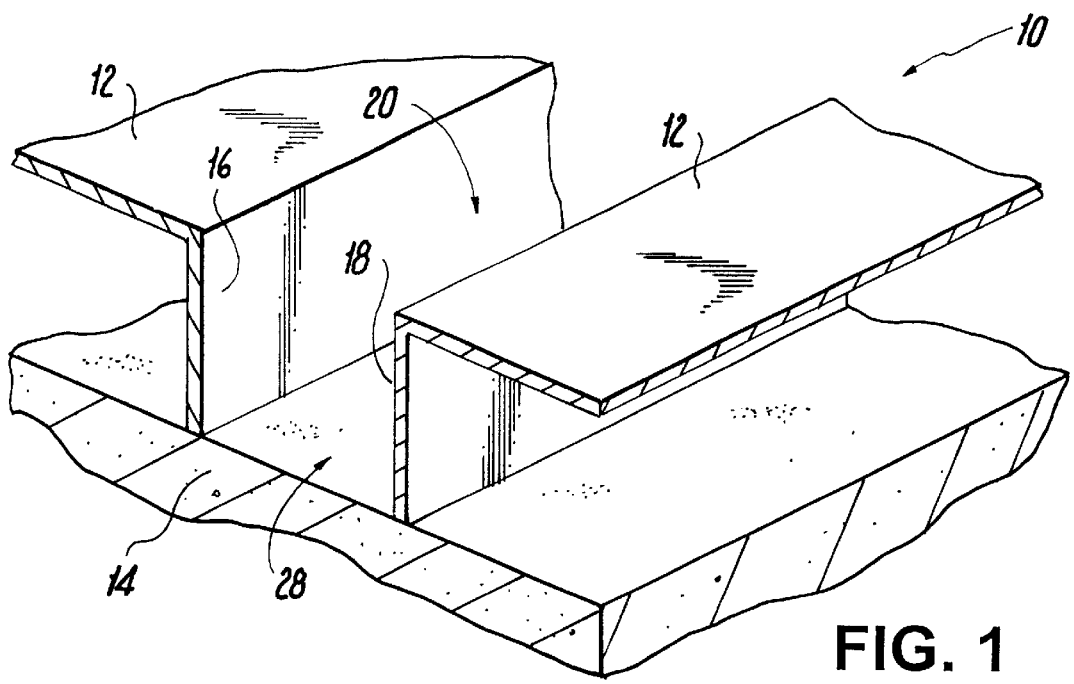
FIG. 1 is a partial perspective view of a site of use illustrating a raised floor system thereat preparatory to installation therein of a cable support apparatus according to the present invention.

In an office facility, generally designated 10 in FIG. 1, where use is made of fiber optical or electrical cable-operated computers or light switching or communication equipment, the powering electricity or the like is transmitted through cables which advantageously are accommodated in below floor structure, that is a raised floor 12 is constructed above the building floor 14 and channels, such as delimited between the sides 16 and 18 and designated 20, are used as repositories of the cables in the clearance between the floors 12 and 14.

Figure 2:
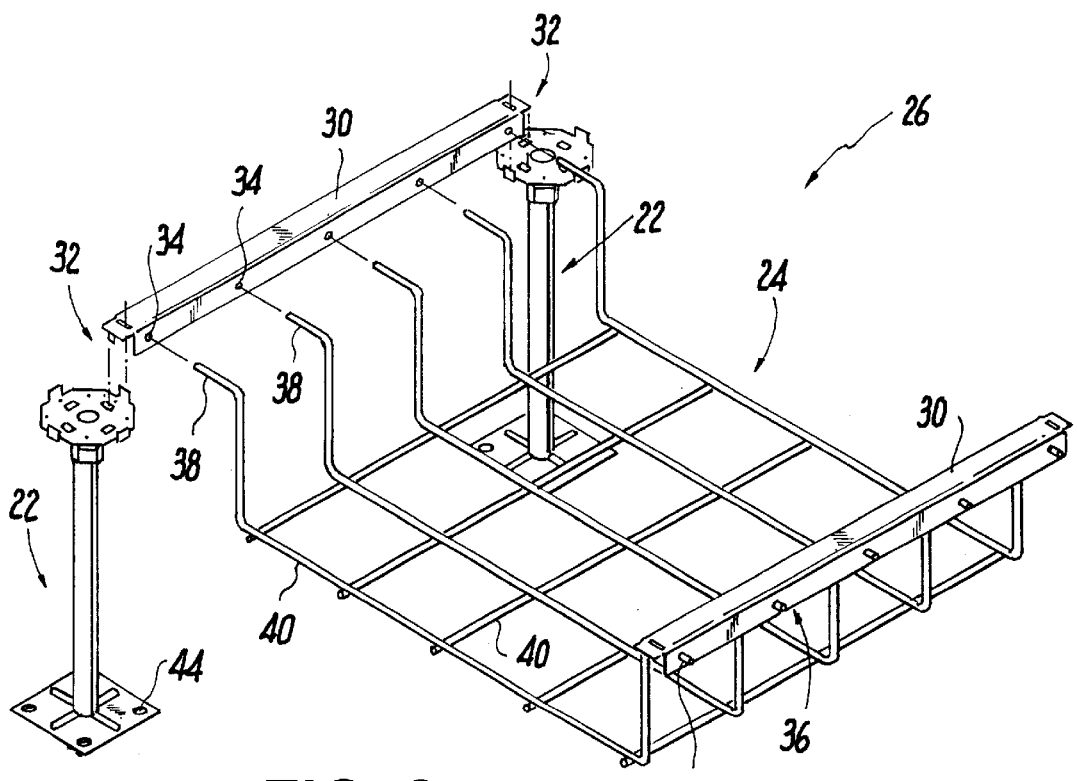
FIG. 2 is a perspective view of a prior art cable support apparatus typically installed in the raised floor system of FIG. 1.

As well understood, a first work crew installs wire basket-supporting structure, such as vertical stanchions individually and collectively designated 22 in a channel 20, as shown in FIG. 2. Next, and again as well understood, a second work crew is typically used to weld wire baskets in side-by-side longitudinal relation (not shown) along the channel 20. This requires welding equipment and is tedious. In the prior art cable support apparatus, generally designed 26 in FIG. 2, the need for welding equipment and the tedium is significantly lessened at its use at the installation site 28 of FIG. 1 by use a wire basket 24 fabricated at a site of manufacture and transported to the installation site 28. Horizontally oriented supports individually and collectively designated 30, are connected at opposite ends, as at 32, in extending relation between cooperating stanchions 22 and are provided with spaced apart openings 34 which receive in projected relation therein, as noted at 36, the free ends 38 of wire rod construction elements 40 of the wire basket 24, the protruding ends 42 of the wire rods 40, as noted in the right side support 30, completing the connection of the wire basket 24 in supported depending relation from the stanchions 22 in turn bolted, as at 44, to the building floor 14.

In accordance with the present invention, the tedium of installation is not merely lessened, but entirely eliminated, as well as other benefits accruing such as the wire baskets being maintained in longitudinal alignment without any significant degree of lateral movement, i.e., a degree of movement necessary for the connection established in the FIG. 2 cable support apparatus 26.

More particularly, each basket 50 in addition to similar structure already described and similarly numerically designated, is modified by having appropriately attached by welding or otherwise at corner locations 52 upstanding outwardly facing hooks 54 terminating in inverted U-shapes 56 of selected widths 58 slightly oversized in relation to the widths 60 bounded by lower opposite end portions of opposite sides 62 of an opening 70 into the hollow interior of the support members 30 connected in spanning relation between each cooperating pair of bolted in place stanchions 22.

As best shown in FIGS. 4 and 5, the depending ends of the full opposite sides 64 and 66 of the support members 30 are imparted with U-shapes 68 and, in the installing connection of a wire basket 50 to the supports 30 illustrated in sequence in FIGS. 4 and 5, the wire basket 50 is lowered below and between the spaced apart supports 30 so that the hooks 54 are in alignment with the openings 70 of a compartment 72 bounded by the sides 64, 66. Next, the wire basket 50 is urged in ascending movement 74 which results in the inverted U-shape 56 camming apart the support member U-shapes 68 and the projection of the inverted U-shape 56 into the compartment 72. When thereafter released, the wire basket 50 partakes of descending movement 76 which causes interengagement, as at 78, of the oppositely directed configured U-shapes 56 and 68. In this facilitated manner the wire baskets 50 are supported in depending relation from the stanchions 22 along the channels 20.

Although not shown, it will be understood that using clips or otherwise as appropriate, that closure panels are positioned in the channel openings at the raised floor level to conceal the channels and their cable support apparatus with power cable content.

While the cable support apparatus disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. At a site of use of cable-operated computers of a type consisting of an upper floor above a lower floor and having spaced apart side walls bounding therebetween a channel repository of said cables of said computers, an interconnected construction of plural wire baskets cable-supports having an operative position in said channel repository, at least one said wire basket cable-support comprising four vertical stanchions in a spaced apart rectangular configuration, at least two horizontal supports connected in spanning relation between two cooperating corner stanchions adjacent facing sides of said channel repository, each said horizontal support having spaced apart side walls bounding an elongated inverted U-shaped main compartment extending lengthwise of said channel repository, each said side wall of said horizontal support having a U-shaped peripheral edge defining an entrance opening into said main compartment and bounding a correspondingly U-shaped auxiliary compartment extending lengthwise of said channel repository and on opposite sides of said main compartment, and a rectangular shaped wire basket having at corner locations along opposite sides upstanding basket-attaching members terminating in inverted U-shaped hooking means, said U-shaped hooking means being slightly oversized in width in relation to a width of said entrance opening-defining U-shaped peripheral edges, said U-shaped hooking means in response to ascending movement from below and into said main compartment effective to cam apart said side wall U-shaped peripheral edges and thereafter to snap into interengaging relation with said U-shaped peripheral edges as caused by opposing said U-shapes and inverted U-shapes thereof, whereby a wire basket connected in depending relation from said support members within said channel repository is without welding or bolted connection thereto.

* * * * *